Feb. 20, 1962   L. W. DIXON   3,022,002
PARALLEL RULE-SLIDE RULE
Filed Feb. 17, 1959
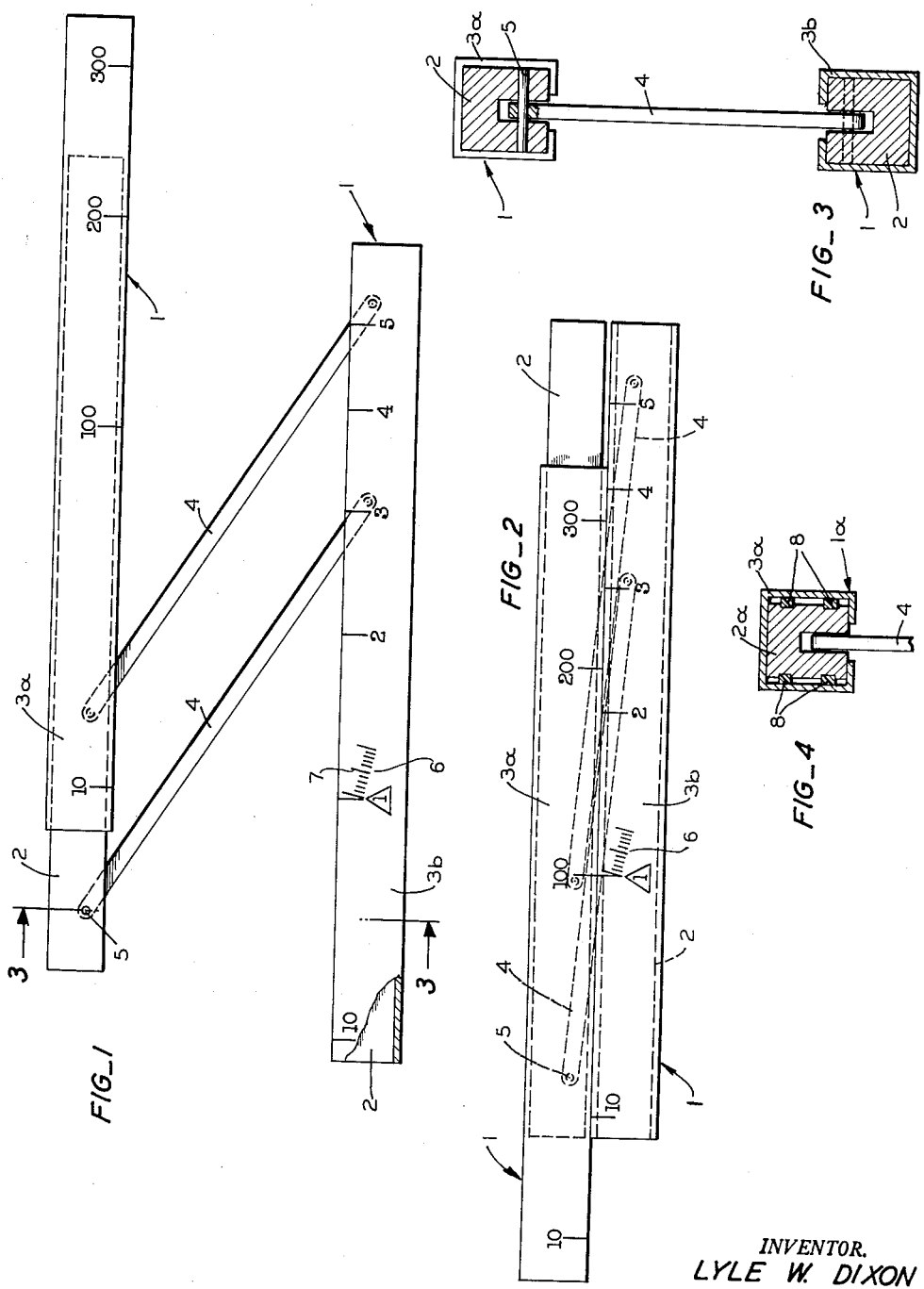
INVENTOR.
LYLE W. DIXON
BY Carl Hoppe
ATTORNEYS United States Patent Office 3,022,002
Patented Feb. 20, 1962

3,022,002
PARALLEL RULE-SLIDE RULE
Lyle W. Dixon, Redwood City, Calif.
Filed Feb. 17, 1959, Ser. No. 793,847
6 Claims. (Cl. 235—70)

This invention relates generally to a combination parallel rule and slide rule particularly adapted for use by navigators and others engaged in map interpretation, navigation and similar activities.

Parallel rules comprising two blade members linked together so as to permit one blade to be positioned at varying distances from the other while still maintaining parallelism therewith are well known in this art. Furthermore, slide rules used for computing by multiplication or division comprising a stationary scale and a movable scale slidably attached thereto are also well-known. However, there is a long felt and unsatisfied want for a device which combines the features of a parallel rule with those of a slide rule to form a navigator's instrument which is convenient both for making simple calculations and for plotting work.

Therefore it is one object of this invention to combine into a single instrument both the features of a parallel rule and those of a slide rule.

It is another object of this invention to provide a parallel rule with sliding scales thereon with which simple calculations may be made.

It is still another object of this invention to provide a calculating instrument whereby computations using indicated data (e.g., indicated air speed) may be corrected to a true result as a function of one or more variables (e.g., true air speed as a function of altitude).

Other and further objects and advantages of the present invention will become apparent from the following description taken in connection with the accompanying drawings wherein:

FIG. 1 is an elevational view of a specific embodiment of this invention with the parallel rule blades spread apart;

FIG. 2 is an elevational view of the present invention with the parallel rule blades adjacent to one another;

FIG. 3 is a cross-sectional view of the device taken along line 3—3 of FIG. 1; and FIG. 4 is a cross-sectional view of one of the rule blades illustrating a modification of the present invention.

Referring now to the drawings wherein the various elements have been referred to with like numerals throughout the several figures, the present invention is comprised of a pair of blades referred to generally as 1, each having an inner core member 2, and each core member being slidably contained within an outer shell 3a and 3b, respectively. The core members 2 of each blade 1 are interconnected by a pair of link members 4, the extremities of each of which are pinned as by pins 5 to the core members 2.

The core members 2 are approximately rectangular in shape, but, as indicated in FIG. 3, each has a longitudinal slot extending the length thereof into which the link members 4 fold when the blades 1 are brought together as illustrated in FIG. 2. The core members 2 may be made from fibrous material or metal, and in their preferred form the longitudinal slot therein along with the link members are machined to close tolerances so that the fit between each link 4 and the walls of the slot in each core member 2 is close enough to provide a frictional resistance. It is by this frictional resistance that the blades 1 are held in the desired position when manually pulled apart, as illustrated in FIG. 1, and contributes to the ease of operation of the present invention.

The shell members 3a and 3b, respectively, slide over each core member 2 and also contain a slot as illustrated in FIG. 3 to receive the link members 4. Each shell member closely encompasses its respective core 2. The resultant coefficient of friction between the two permits the shell to slide freely over the core with the application of a nominal force and offers enough resistance to movement that the shell does not slide without application of such force. Thus, the shell members 3a and 3b sliding over their respective cores 2 will function as do the slides of an ordinary slide rule.

A suitable scale may be engraved directly upon each shell member or applied thereto with methods that will be apparent to those familiar with the slide rule art. For the purposes of this descriptioin, however, shell member 3a is illustrated having a logarithmic scale from 10 through 300, referred to herein as the top scale, whereas shell 3b has a logarithmic scale from 10 minutes through 5 hours, referred to herein as the bottom scale. These particular scales are useful in computing the hourly fuel consumption or speed of an aircraft. By dividing the total number of miles traveled or gallons of fuel consumed on the top scale by appropriate number of hours on the bottom scale, the average speed or average fuel consumption may be readily calculated.

In the particular embodiment of the present invention illustrated, an auxiliary scale is used, for example an air speed correction scale 6 lying obliquely to the major scale of shell member 3b is illustrated. This particular scale is arranged to correct indicated air speed shown by the two major scales on shell members 3a and 3b, respectively, to true air speed as a function of altitude. For example, if 100 on the top scale is set to correspond to the 1 hour mark on the bottom scale, the indicated air speed would be 100 miles per hour; but, by using the correction scale 6 which is divided into 10 segments each representing a thousand feet, the true air speed at an altitude of 5000 feet would be shown to be approximately 109 miles per hour. This speed is read off the top scale directly opposite the 5000 mark 7 of the oblique correction scale 6.

It will be observed in FIG. 2 that in the closed position the link members 4 extend almost the entire length of each blade and provide considerable support between the blades against twisting. Also in the device illustrated herein the link members 4 are made as long as possible in relation to their respective widths so as to provide maximum throw of the blades 1.

FIG. 4 of the present invention illustrates a blade 1a in cross-section showing a modification of the present invention. In this view the core member 2a is provided along its sides with linear beads 8 of plastic or other frictional material to provide running surfaces upon which the outer shell 3a may slide with the proper coefficient of friction.

The utility of the present device will be apparent from the foregoing description and it will also be apparent that the blades of the device may be used as an extensible straight edge. Moreover, it is to be understood that the various elements or parts of the device may be made from many materials, such as plastic, light-weight metals or alloys, ivory, wood, etc. In addition, various changes and modifications may be apparent to those familiar with this art without departing from the present invention; therefore, this invention is not to be construed as being limited by the foregoing illustration, but is defined by the appended claims.

I claim:

1. A combination parallel rule-slide rule comprising a parallel rule having a pair of cores, a pair of pivoted link members interconnecting said cores for maintaining parallelism of said cores, and at least two manually reciprocable slidable shells carrying cooperating computing scales, one of said shells being mounted on each of said cores.

2. A combination parallel rule-slide rule comprising a parallel rule having a pair of cores, a pair of pivoted link members interconnecting said cores for maintaining parallelism of said cores; at least two manually reciprocable slidable shells carrying cooperating computing scales along the longitudinal margins thereof, one of said shells being mounted on each of said cores; and at least one correction scale set obliquely to said computing scale and carried on one of said shells.

3. A combination parallel rule-slide rule comprising a parallel rule having a pair of cores each carrying a longitudinal slot extending the length thereof, a pair of link members interconnecting said cores, the extremities of said link members being pinned to said cores for maintaining parallelism of said cores; a pair of shells, each said shell enclosing one of said cores and formed with a slot extending the length thereof corresponding to the slot in said core for receiving said link members; and at least two cooperating computing scales, one carried on each of said shells and extending along the margins thereof.

4. A combination parallel rule-slide rule comprising a parallel rule having a pair of cores each carrying a longitudinal slot extending the length thereof, a pair of link members interconnecting said cores, the extremities of said link members being pinned to said cores for maintaining parallelism of said cores; a pair of shells, each said shell enclosing one of said cores and formed with a slot extending the length thereof corresponding to the slot in said cores for receiving said link members; at least two cooperating computing scales, one carried on each of said shells and extending along the margins thereof; and at least one correction scale set obliquely to said cooperating computing scale and carried on one of said shells.

5. A combination parallel rule-slide rule comprising a parallel rule having a pair of core members each formed with a longitudinal slot extending the length thereof, a pair of links interconnecting said core members to maintain parallelism of said cores; a pair of shell members, each said shell member enclosing one of said cores and formed with a slot extending the length thereof corresponding to the slot in said core members to receive said links; means disposed between each said shell member and enclosed core member providing frictional engagement between said members; each said shell member provided with a cooperating computing scale extending along abutting marginal edges thereof; and a correction scale carried obliquely to said computing scale on one of said shell members.

6. The combination of claim 5 wherein said means comprises a plurality of resilient beads linearly disposed between said shell members and enclosed core members, said beads being affixed to one of said members and frictionally engaging the opposed surface of the other member.

References Cited in the file of this patent

UNITED STATES PATENTS

| 2,486,748 | Koenig | Nov. 1, 1949 |

FOREIGN PATENTS

| 343,658 | France | Aug. 12, 1904 |
| 173,660 | Germany | July 27, 1906 |
| 14,410 | Great Britain | Aug. 20, 1903 |
| 25,109 | Great Britain | Nov. 18, 1903 |
| 216,365 | Great Britain | May 29, 1924 |